(12) United States Patent
Kim

(10) Patent No.: US 6,310,597 B1
(45) Date of Patent: Oct. 30, 2001

(54) DISPLAY APPARATUS WITH COLOR VIDEO CONTROL SIGNAL FUNCTION

(75) Inventor: Young-Chan Kim, Anyang (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/216,743

(22) Filed: Dec. 21, 1998

(30) Foreign Application Priority Data

Dec. 19, 1997 (KR) ................................................ 97-70488

(51) Int. Cl.[7] ........................................................ G09G 3/36
(52) U.S. Cl. ................................ 345/98; 345/3; 345/88
(58) Field of Search ................................ 345/98, 87, 88, 345/89, 94, 3, 55; 348/790, 791

(56) References Cited

U.S. PATENT DOCUMENTS

| | | | |
|---|---|---|---|
| 4,275,421 | * 6/1981 | Louie et al. | 345/98 |
| 5,317,401 | * 5/1994 | Dupont et al. | 345/94 |
| 5,751,261 | 5/1998 | Zavracky et al. | 345/55 |
| 5,841,430 | * 11/1998 | Kurikko | 345/213 |

* cited by examiner

*Primary Examiner*—Dennis-Doon Chow
(74) *Attorney, Agent, or Firm*—Robert E. Bushnell, Esq.

(57) ABSTRACT

A display apparatus for converting the analog video signals from a host into corresponding digital video data applied to an LCD panel, comprises a microprocessor for generating a video level control signal to control the level of the video data, a preamplifier for amplifying the analog video signals according to a given amplification factor control signal, an A/D converter for converting the amplified analog video signals of the preamplifier into corresponding digital video data based on the read clock signal from an input PLL, and an LCD driver for setting the value of the input video data based on the video level control signal to deliver the digital video data from the A/D converter to the LCD panel, wherein the LCD driver generates an amplification factor control signal applied to the preamplifier to reduce the value of the digital video data from the A/D converter when the value of the digital video data is greater than the set value of the input video data.

11 Claims, 6 Drawing Sheets

DISPLAY APPARATUS WITH COLOR VIDEO CONTROL SIGNAL FUNCTION

CLAIM OF PRIORITY

This application makes reference to, incorporates the same herein, and claims all benefits accruing under 35 U.S.C §119 from an application entitled Display Apparatus With Color Video a Control Signal Function earlier filed in the Korean Industrial Property Office on Dec. 19, 1997, and there duly assigned Ser. No. 97-70488 by that Office.

BACKGROUND OF THE INVENTION

1. Field of the Invention

The present invention concerns a display apparatus, and more particularly a display apparatus for converting analog video signals from a host into digital video signals displayed on a liquid crystal display (LCD) panel.

2. Background of the Invention

As the LCD frequently replaces the CRT to display the analog video signals from a computer, there becomes required an apparatus for converting the analog video signals into corresponding digital video signals.

In a conventional LCD video display apparatus, analog RGB video signals, horizontal sync signals and vertical sync signals from a host are input through a connector and amplified by a preamplifier to a TTL level. Then, the amplified analog video signals are converted into corresponding digital video signals and applied to a LCD driver composed of an application-specific integrated circuit (ASIC).

Generally, the maximum level of the video signal input to the LCD display apparatus is about 0.7V, which is amplified by the preamplifier 20 to the TTL level of maximum 5V. However, if video signals of maximum 1.4V are input into such a LCD display apparatus with the input level of 0.7V, the output of the preamplifier becomes 10V at maximum. This causes the generation of saturated digital values (maximum values) for the video signals of more than 0.7V, thereby resulting in distorted images.

U.S. Pat. No. 5,751,261 to Matthew Zavracky et al. and entitled Control System For Display Panels provides an example of a known connector used for supplying the RGB video signals, horizontal sync signals and vertical sync signals from a host computer to a LCD panel.

SUMMARY OF THE INVENTION

It is an object of the present invention to provide a display apparatus for converting the analog color video signals from a computer into corresponding digital video data applied to an LCD panel which includes means for reducing the amplification factor of the preamplifier so as not to saturate the digital video data when the input video signals have the maximum voltage level exceeding a given value.

According to an embodiment of the present invention, a display apparatus for converting the analog video signals from a host into corresponding digital video data applied to an LCD panel, comprises a microprocessor for generating a video level control signal to control the level of the video data, a preamplifier for amplifying the analog video signals according to a given amplification factor control signal, an A/D converter for converting the amplified analog video signals of the preamplifier into corresponding digital video data based on the read clock signal from an input PLL, and an LCD driver for setting the value of the input video data based on the video level control signal to deliver the digital video data from the A/D converter to the LCD panel, wherein the LCD driver generates an amplification factor control signal applied to the preamplifier to reduce the value of the digital video data from the A/D converter when the value of the digital video data is greater than the set value of the input video data. The input PLL generates the read clock signal based on an input phase control signal delivered from the microprocessor. Preferably, an write PLL is further provided to generate an write clock signal based on an output phase control signal delivered from the microprocessor. The amplification factor control signal is preferably pulse-width modulated. The pulse width of the amplification factor control signal is reduced if the value of the digital video data from the A/D converter is greater than the set value of the input video data. The LCD driver is preferably designed to generate the amplification factor control signal for the preamplifier to amplify the analog video signals to 5V at maximum.

According to another embodiment of the present invention, a display apparatus for converting the analog video signals from a host into corresponding digital video data applied to an LCD panel, comprises a microprocessor for generating a video level control signal to control the level of the video data, a preamplifier for amplifying the analog video signals according to a given amplification factor control signal, an AID converter for converting the amplified analog video signals of the preamplifier into corresponding digital video data based on the read clock signal from an input PLL, and an LCD driver for setting the value of the input video data based on the video level control signal to deliver the digital video data from the A/D converter to the LCD panel, wherein the LCD driver generates a first amplification factor control signal when the value of the digital video data is greater than the set value of the input video data, and the microprocessor generates a second amplification factor control signal according to the first amplification factor control signal applied to the preamplifier to reduce the value of the digital video data from the A/D converter. The input PLL generates the read clock signal based on an input phase control signal delivered from the microprocessor. Further included is an write PLL for generating an write clock signal based on an output phase control signal delivered from the microprocessor. The second amplification factor control signal is preferably pulse-width modulated. The LCD driver is preferably designed to generate the first amplification factor control signal applied to the microprocessor for the preamplifier to amplify the analog video signals to 5V at maximum.

The microprocessor generates the input/output phase control signals according to the sync signal from the host together with the reference signal to deal with the level of the color video signal received from the host. The read and write PLLs respectively generate the read and write clock signals according to the input/output phase control signals. The preamplifier is to amplify the level of the color video signal from the host based on the amplification factor control signal. The A/D converter is to convert the amplified analog video signal into corresponding digital video data. The LCD driver generates the amplification factor control signal, according to which the preamplifier is controlled to reduce the amplification factor if the level of the digital video data is over the set value. The LCD driver also transfers the digital video data in response to the write clock signal. Thus, if the maximum level of the analog video signals from the host is over the initially set value, the preamplifier is controlled to reduce the amplification factor so as to prevent the amplified analog video signal from being saturated.

The present invention will now described more specifically with reference to the drawings attached only by way of examples.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
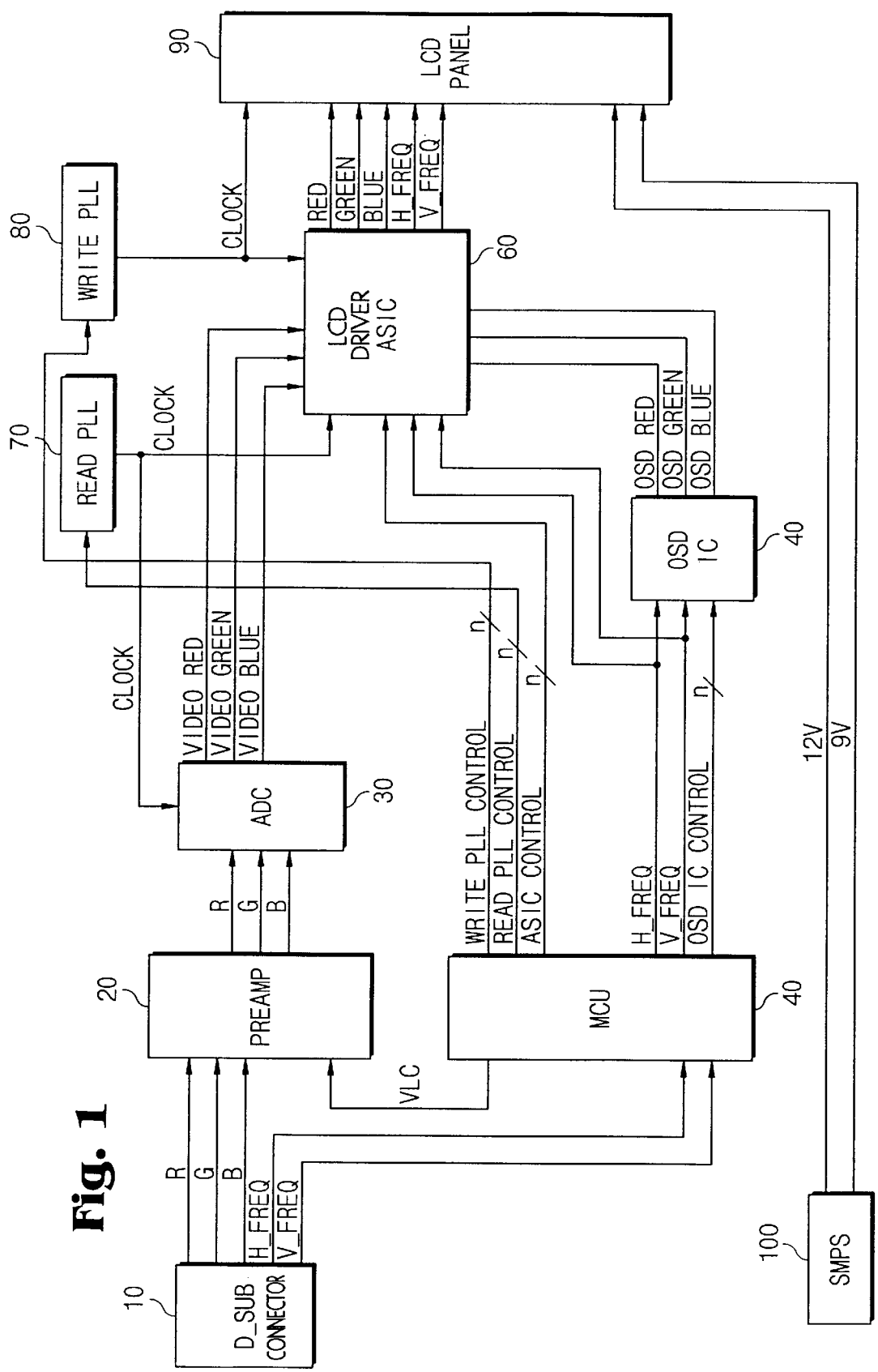
FIG. 1 is a block diagram for illustrating an exemplary display apparatus without means for adjusting the level of the input analog video signals.

Referring to FIG. 1, a video display apparatus for processing the analog video signals from a computer to display on the LCD panel includes a connector 10, a preamplifier 20, an analog-to digital (A/D) converter 30, a microprocessor 40, an on-screen display (OSD) controller 50, an LCD driver 60, phase locked loops (PLLS) 70 and 80, and an LCD panel 90. The analog video signals R, G, B and horizontal and vertical sync signals H_FREQ and V_FREQ from a host is input through the connector 10, and amplified by the preamplifier 20 to the TTL level based on a video level control (VLC) signal of the microprocessor 40. Then, the amplified analog video signals are converted by the A/D converter 30 into corresponding digital video signals and applied to the LCD driver 60 composed of an application-specific integrated circuit (ASIC).

Generally, the maximum level of the video signal inputted to the display apparatus is about 0.7V, which is amplified by the preamplifier 20 to the TTL level of maximum 5V. To this end, the microprocessor 40 generates the video level control signal VLC for the preamplifier 20 to make about 7.14 times amplification. However, if the video signals of maximum 1.4V are input into such a display apparatus with the input level of 0.7V, the output of the preamplifier 20 becomes 10V at maximum. This causes the A/D converter 30 to generate the saturated values (maximum values) for the video signals of more than 0.7V, thereby resulting in distorted images.

Figure 2:
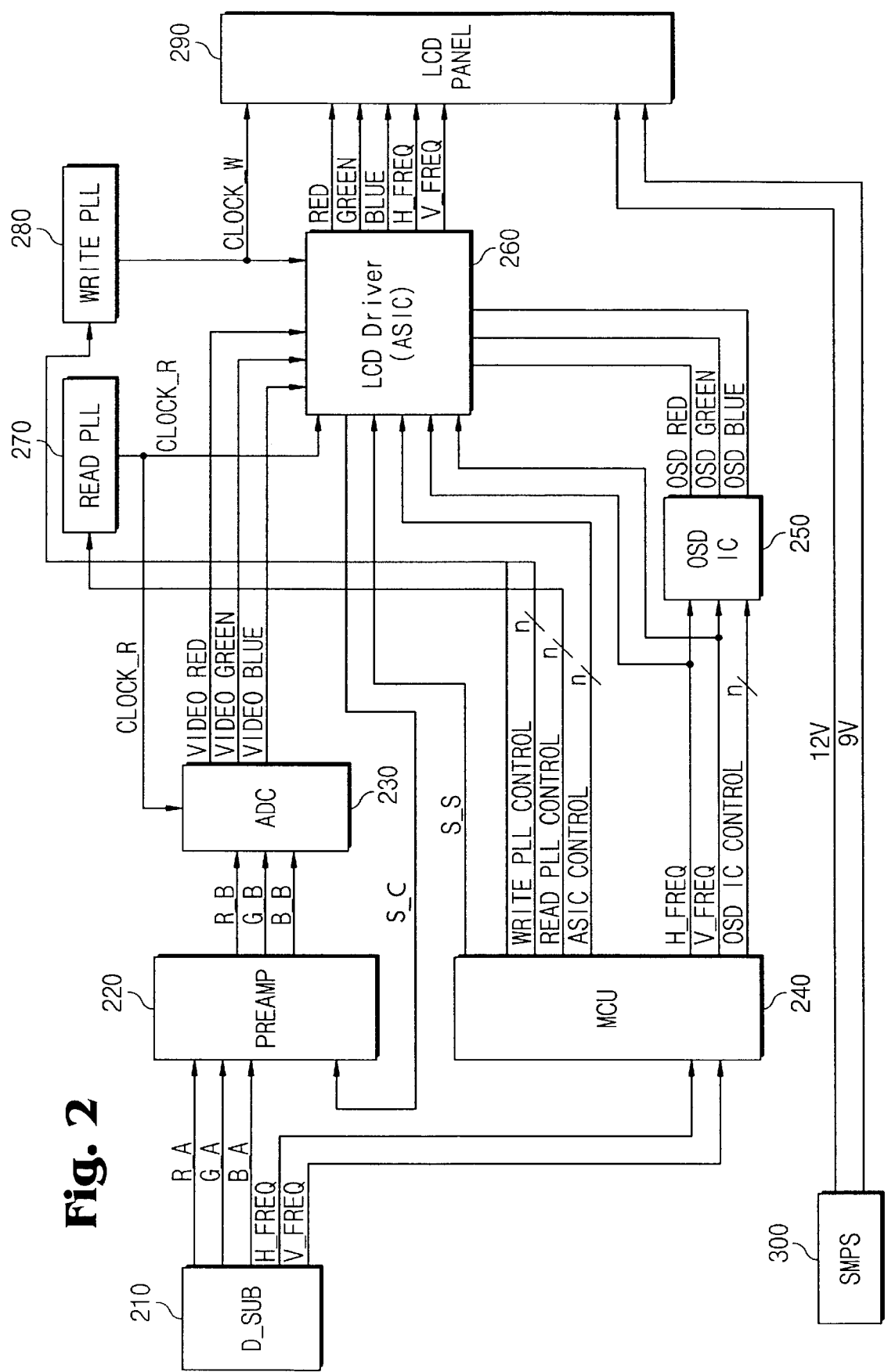
FIG. 2 is a view similar to FIG. 1. but with the LCD driver having means for controlling the amplification factor of the preamplifier to prevent the output video data from being saturated according to an embodiment of the present invention.

Referring to the embodiment shown in FIG. 2, the display apparatus includes a preamplifier 220, an A/D converter 230, a microprocessor 240, an input PLL 270, a write PLL 280, a LCD driver 260 and a LCD panel 290. The LCD driver 260 controls the amplification factor of the preamplifier 220 based on the level of the output data of the A/D converter 230.

The red, green and blue analog video signals R_A, R_G and R_B are delivered from the host through a connector 210 to preamplifier 220. The horizontal and vertical sync signals H_FREQ and V_FREQ are delivered through connector 210 to microprocessor MCU 240 to generate the read and write PLL control signals respectively applied to read and write PLLs 270 and 280. The read PLL 270 generates the read clock signal CLOCK_R in response to the read PLL control signal READ PLL CONTROL. The read clock signal CLOCK_R is delivered to the clock inputs of A/D converter 230 and LCD driver 260. Likewise, the write PLL 280 generates the write clock signal CLOCK_W in response to the write PLL control signal WRITE PLL CONTROL. The write clock signal CLOCK_W is delivered to the clock inputs of LCD driver 260 and LCD panel 290.

The microprocessor 240 generates a video level control signal S_S assuming that the analog video signals received from the host through the connector 210 have the maximum level of about 0.7V. The LCD driver 260 sets the maximum value of the digital video data VIDEO_RED, VIDEO_GREEN and VIDEO_BLUE based on the video level control signal S_S to generate an amplification factor control signal S_C applied to the preamplifier 220. Based on the amplification factor control signal, the preamplifier 220 amplifies the analog video signals R_A, G_A, B_A. The amplified analog video signals R_B, G_B, B_B are converted (sampled) by the A/D converter 230 into corresponding digital video data in response to the read clock signal CLOCK_R. The digital video data are delivered from the A/D converter 230 to the LCD driver 260. Meanwhile, the microprocessor 240 generates the horizontal and vertical sync signals H-FREQ and V_FREQ applied to the LCD driver 260 and the on-screen display controller 250 OSD IC. In addition, the microprocessor 240 generates an LCD driver control signal ASIC CONTROL and an OSD control signal OSD IC CONTROL respectively applied to the LCD driver 260 and the on-screen display controller 250. The LCD driver 260 generates the digital video signals RED, GREEN, BLUE and the horizontal and vertical sync signals HFREQ and V_FREQ delivered to the LCD panel 290. Here, it is assumed that the LCD driver 260 set the maximum value of the input data to a binary value "11111110" for the output digital video data to have the maximum binary value "11111111".

Figure 3:
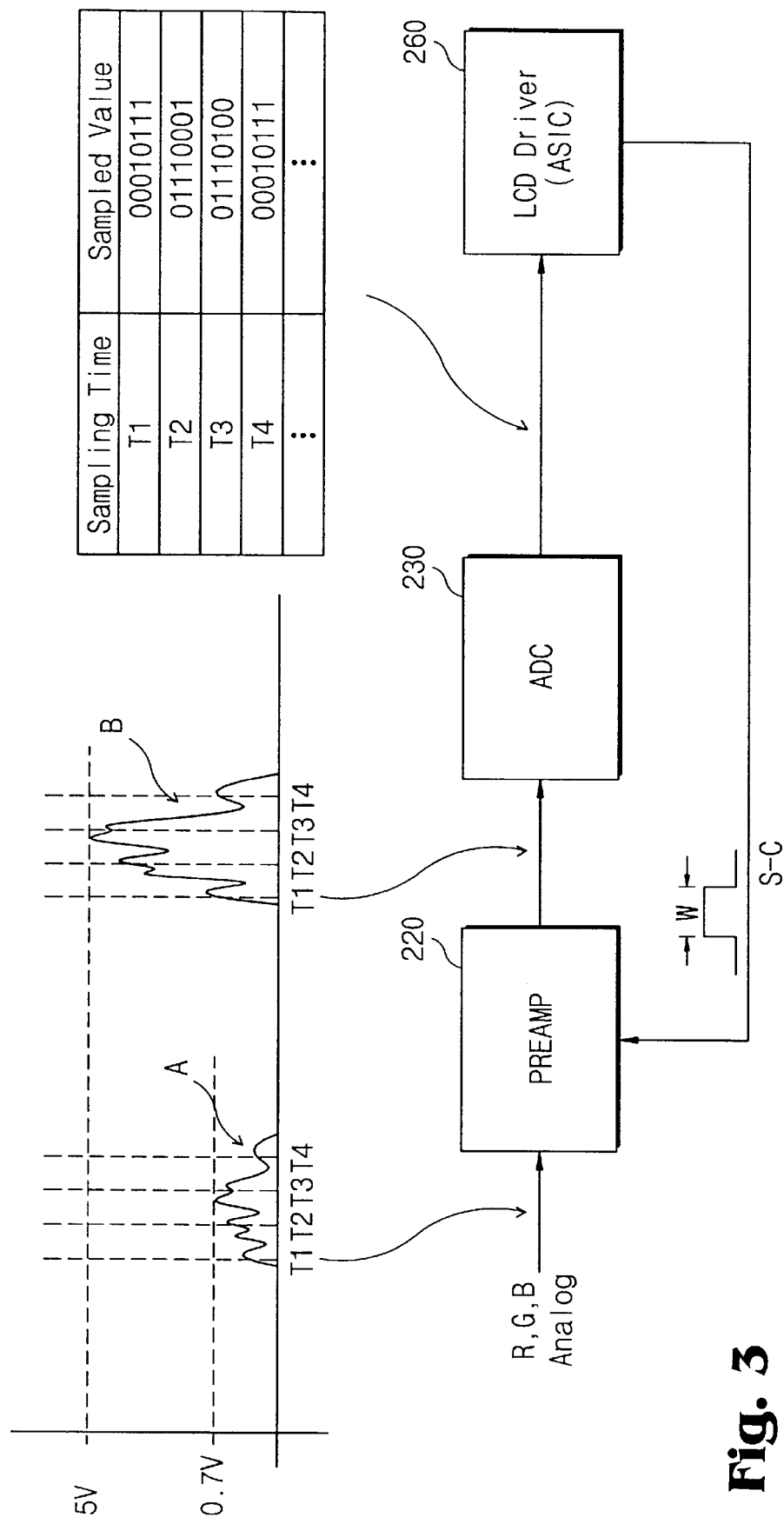
FIG. 3 is a diagram for illustrating the sampling of the input analog video signals whose levels are within a reference level.

When the analog video signal delivered from the host to the preamplifier is in the normal level of 0.7V as shown in FIG. 3, the LCD driver 260 generates the amplification factor control signal S_C to make the preamplifier 220 have the amplification factor of 7.14, so that the output level of the preamplifier 220 may be in 5V. In this case, the amplification factor control signal S_C is pulse width modulated to have the pulse width "W". As shown in the drawing, the waveform "A" of the analog video signal is amplified by the preamplifier 220 to the waveform "B". Then, the A/D converter 230 samples "00010111 at time T1, "0110001" at T2, 01110100 at T3 and "00010111" at T4 from the waveform "B" received from the preamplifier 220.

Figure 4:
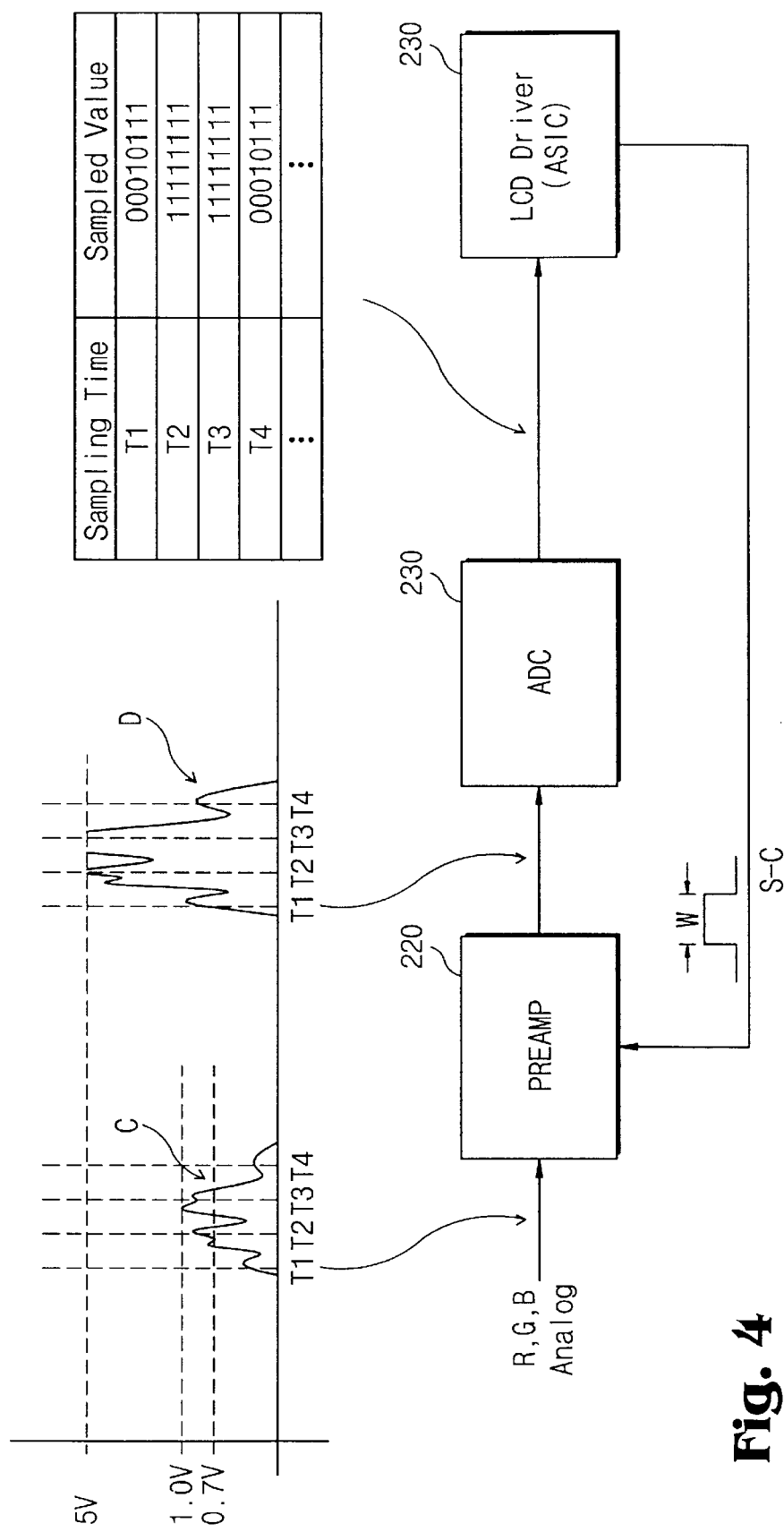
FIG. 4 is a diagram similar to FIG. 3 but with the levels of the input analog video signals being over the reference level.
Figure 5:
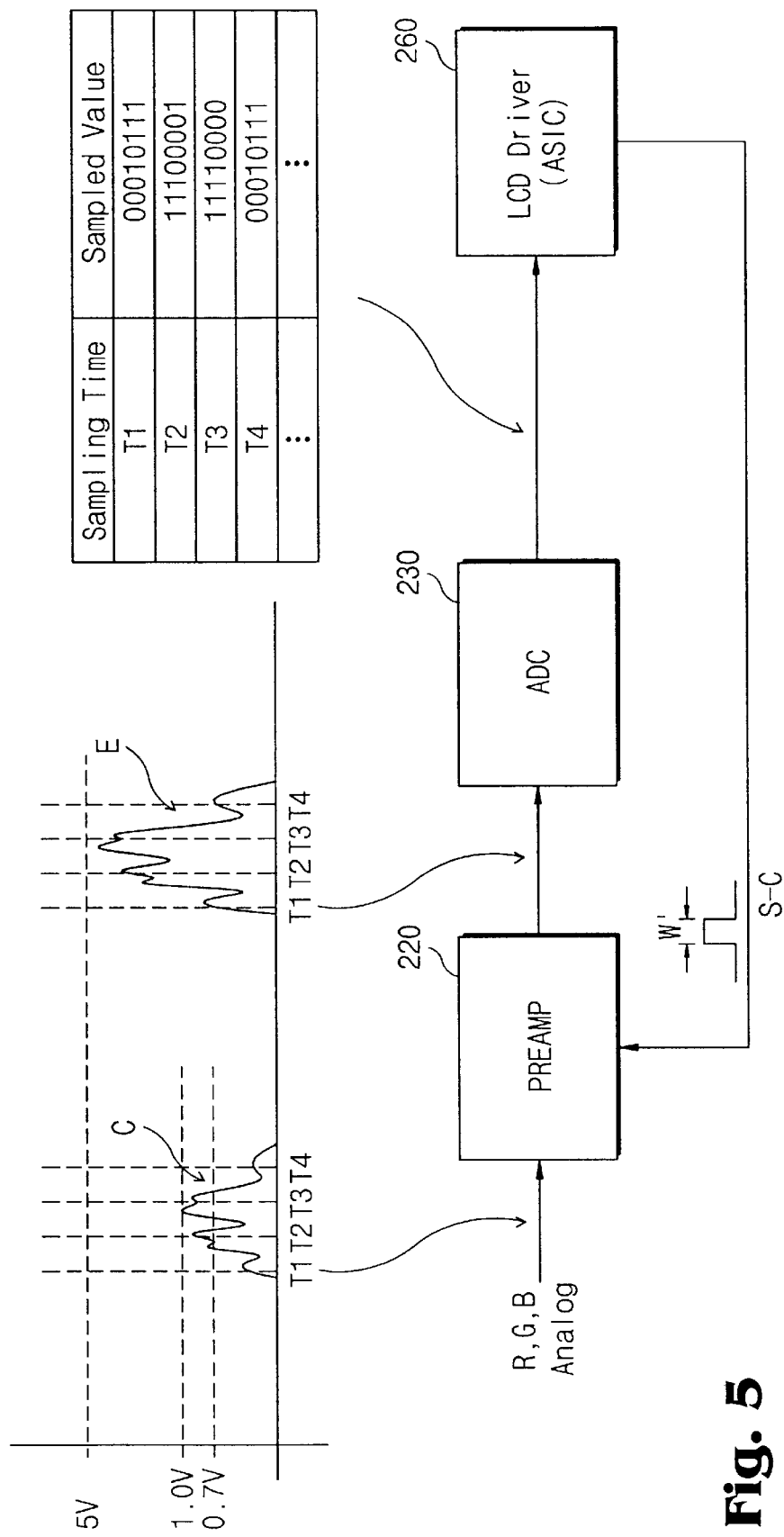
FIG. 5 is a diagram for illustrating that the amplification factor of the preamplifier is controlled so as to prevent the input video signals from being saturated when the levels of the input video signals exceed the reference level.

Alternatively, when the analog video signal inputted to the preamplifier 220 has the maximum level of 1.0V over the normal level of 0.7V as shown in FIG. 4, and the amplification factor of the preamplifier 220 is set to 7.14 according to the amplification factor control signal S_C from the LCD driver, the output level of the preamplifier 220 becomes 7.14V at T3, where the input waveform "C" has the level of about 1.0V at maximum. Hence, the output value of the A/D converter 230 is saturated to have "11111111" at T2 and T3, where the level of the input waveform "C" exceeds the normal level of 0.7V. Then, after sampling the output waveform "D", the LCD driver 260 adjusts the amplification factor control signal S_C to set the amplification factor of the preamplifier 220 to have the value of 5, as shown in FIG. 5. Namely, the pulse width of the amplification factor control signal S_C is reduced to "W'". Thus, the preamplifier 220 amplifies the input waveform "C" by 5 times to produce the waveform "E". For example, the AID converter 230 generates a sampled value "11110000" at T3, delivering unsaturated normal digital video data to the LCD driver 260.

Figure 6:
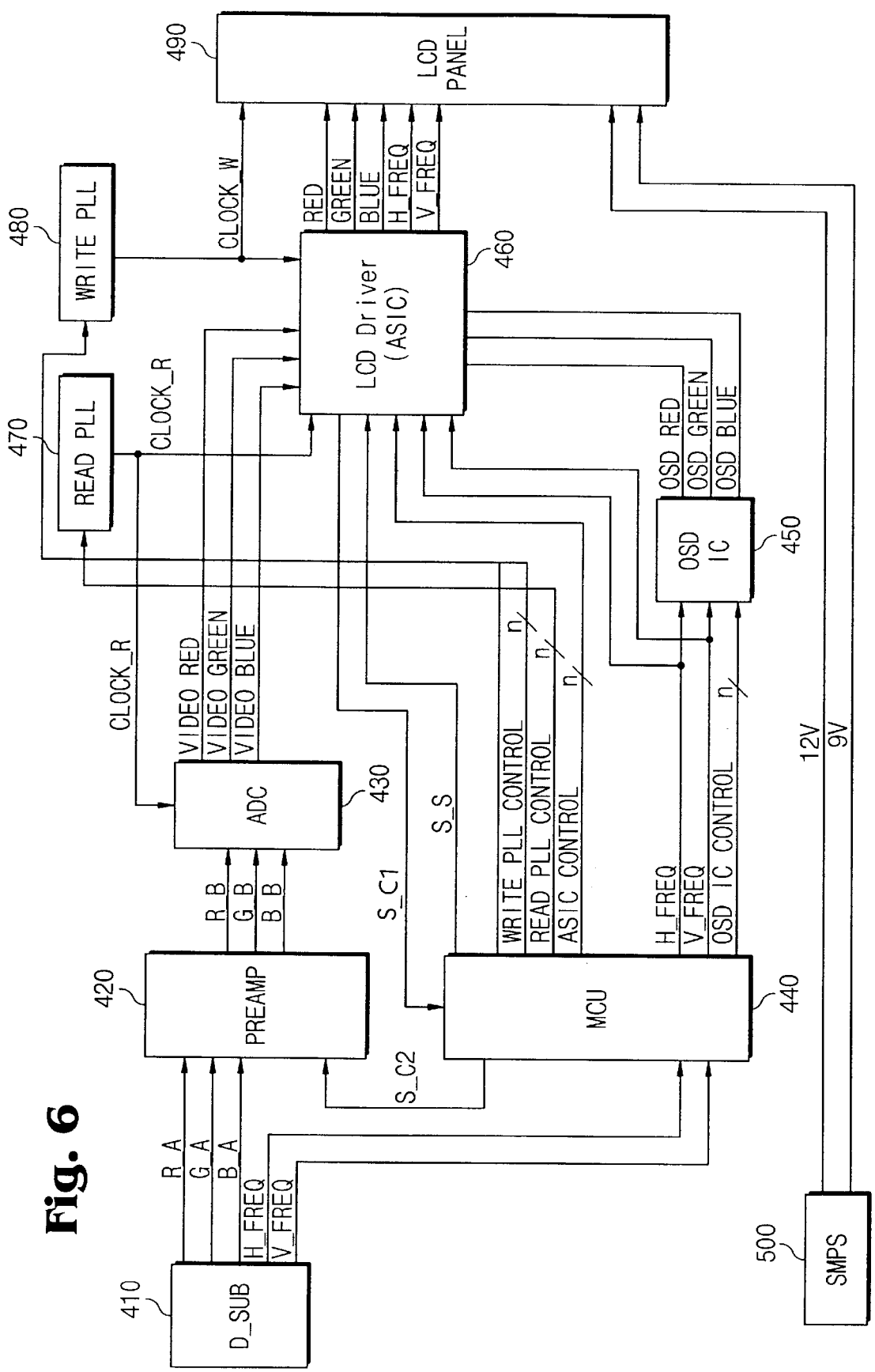
FIG. 6 is a view similar to FIG. 2 according to another embodiment of the present invention.

Referring to second embodiment shown in FIG. 6, the display apparatus includes a preamplifier 420, an A/D converter 430, a microprocessor 440, an input PLL 470, an write PLL 480, an LCD driver 460 and an LCD panel 490. The LCD driver 460 controls the amplification factor of the preamplifier 420 based on the level of the output data of the AID converter 430.

The microprocessor 440 generates a video level control signal S_S to the LCD driver 460 to set the maximum value of the digital video data received from the A/D converter 430, for example, as "11111110", so that the LCD driver 460 generates a first amplification factor control signal S_C1 to make the microprocessor 440 generate a second amplification factor control signal S_C2. The preamplifier 420 amplifies the input analog video signals R_A, G_A, B_A according to the second amplification factor control signal S_C2, whose pulse width is adjusted. Namely, the LCD driver 460 generates the first amplification factor control signal S_C1 according to the video level control signal S_S received from the microprocessor 440. Then, the microprocessor 440 generates the second amplification factor control signal S_C2 to control the amplification factor of the preamplifier 420 according to the first amplification factor control signal S_C1.

What is claimed is:

1. A display apparatus for converting the analog video signals from a host into corresponding digital video data applied to a liquid crystal display (LCD) panel, comprising:
   a microprocessor for generating a video level control signal to control the level of said video data;
   a preamplifier for generating amplified analog video signals by amplifying said analog video signals according to an amplification factor control signal;
   an analog-to-digital (A/D) converter for converting the amplified analog video signals into corresponding digital video data based on a read clock signal from a read phase locked loop; and
   an LCD driver for setting a maximum value of the digital video data based on said video level control signal to deliver said digital video data from said A/D converter to said LCD panel, wherein said LCD driver generates said amplification factor control signal applied to said preamplifier to reduce the value of said digital video data from said A/D converter when the value of said digital video data is greater than the set maximum value.

2. A display apparatus as set forth in claim 1, wherein said read phase locked loop generates said read clock signal based on an input phase control signal delivered from said microprocessor.

3. A display apparatus as set forth in claim 1, further including a write phase locked loop for generating a write clock signal based on an output phase control signal delivered from said microprocessor, said write clock signal being provided to said LCD driver and said LCD panel.

4. A display apparatus as set forth in claim 1, wherein said amplification factor control signal is pulse-width modulated.

5. A display apparatus as set forth in claim 4, wherein the pulse width of said amplification factor control signal is reduced if the value of said digital video data from said A/D converter is greater than the set maximum value.

6. A display apparatus as set forth in claim 1, wherein said LCD driver generates said amplification factor control signal for said preamplifier to amplify said analog video signals to 5volts at maximum.

7. A display apparatus for converting the analog video signals from a host into corresponding digital video data applied to a liquid crystal display (LCD) panel, comprising:
   a microprocessor for generating a video level control signal to control the level of said video data;
   a preamplifier for amplifying said analog video signals according to a given amplification factor control signal;
   an analog-to-digital (A/D) converter for converting the amplified analog video signals output from said preamplifier into corresponding digital video data based on a read clock signal from a read phase locked loop; and
   an LCD driver for setting the maximum value of the digital video data based on said video level control signal to deliver said digital video data from said A/D converter to said LCD panel, wherein said LCD driver generates a first amplification factor control signal when the value of said digital video data is greater than the set maximum value, and said microprocessor generates a second amplification factor control signal according to said first amplification factor control signal, said second amplification control factor being applied to said preamplifier to reduce the value of said digital video data from said A/D converter.

8. A display apparatus as set forth in claim 7, wherein said read phase locked loop generates said read clock signal based on an input phase control signal delivered from said microprocessor.

9. A display apparatus as set forth in claim 7, further including a write phase locked loop for generating a write clock signal based on an output phase control signal delivered from said microprocessor, said write clock signal being provided to said LCD driver and said LCD panel.

10. A display apparatus as set forth in claim 7, wherein said second amplification factor control signal is pulse-width modulated.

11. A display apparatus as set forth in claim 7, wherein said LCD driver generates said first amplification factor control signal applied to said microprocessor for said preamplifier to amplify said analog video signals to 5 volts at maximum.

* * * * *